United States Patent [19]

Katz et al.

[11] Patent Number: 4,822,952

[45] Date of Patent: Apr. 18, 1989

[54] ELECTRICAL CABLE JOINT AND ELECTRICAL CABLE TERMINATION AND METHODS OF MAKING SAME

[75] Inventors: Carlos Katz, Edison; Attila Dima, Piscataway; Bruce Bier, Warren Township, Union County, all of N.J.

[73] Assignee: Cable Technology Laboratories, Inc., New Brunswick, N.J.

[21] Appl. No.: 767,648

[22] Filed: Aug. 21, 1985

[51] Int. Cl.$^4$ .................. H02G 15/068; H02G 15/188
[52] U.S. Cl. ..................... 174/73.1; 156/49; 174/DIG. 8
[58] Field of Search .............. 174/73 R, 73 SC, 84 R, 174/88 R, 88 C, DIG. 8; 156/49

[56] References Cited

U.S. PATENT DOCUMENTS

| | | | |
|---|---|---|---|
| 1,642,514 | 9/1927 | Simons | 174/73 R X |
| 2,191,544 | 2/1940 | Ruskin | 174/88 R |
| 3,317,658 | 5/1967 | Smith | 174/88 R X |
| 4,304,616 | 12/1981 | Richardson | 174/73 R X |
| 4,383,131 | 5/1983 | Clabburn | 174/73 R |
| 4,487,994 | 12/1984 | Bahder | 174/73 R |

FOREIGN PATENT DOCUMENTS

| | | | |
|---|---|---|---|
| 2348087 | 4/1975 | Fed. Rep. of Germany | 174/73 R |
| 305898 | 11/1968 | Sweden | 174/84 R |

*Primary Examiner*—Laramie E. Askin
*Attorney, Agent, or Firm*—Darby & Darby

[57] ABSTRACT

A joint structure for covering a joint between cables is provided in which an insulation structure extends over and beyond cut back ends of insulation layers of the cables, but terminates at a distance ahead of cut back ends of insulation shield layers of the cables. The insulation structure of the joint structure includes a multi-layered, heat shrinkable tube with its ends beveled or "feathered". In assembling the joint, the tube is positioned to overlie the cable conductors and the insulation layers of the cables and is shrunk thereover so as to terminate at a distance from the cut back ends of the insulation shield layers of the cables. The heat shrinkable tube can be manufactured with feathered edges, so that no additional time or labor is required to shape the sleeve when the joint is assembled. The joint structure also includes a semiconductive conductor shield member applied in successive convoluted layers over the exposed conductors of the joint prior to application of the heat shrunk tube. The conductor shield member is an elongated strip formed with a narrowed forward portion and a somewhat wider rear portion, which is feathered along either longitudinal edge and overlaps the cable insulation layers. The conductor shield member is constructed to be pre-curled so as to speed assembly of the joint. A termination of a single conductor is also disclosed.

32 Claims, 4 Drawing Sheets

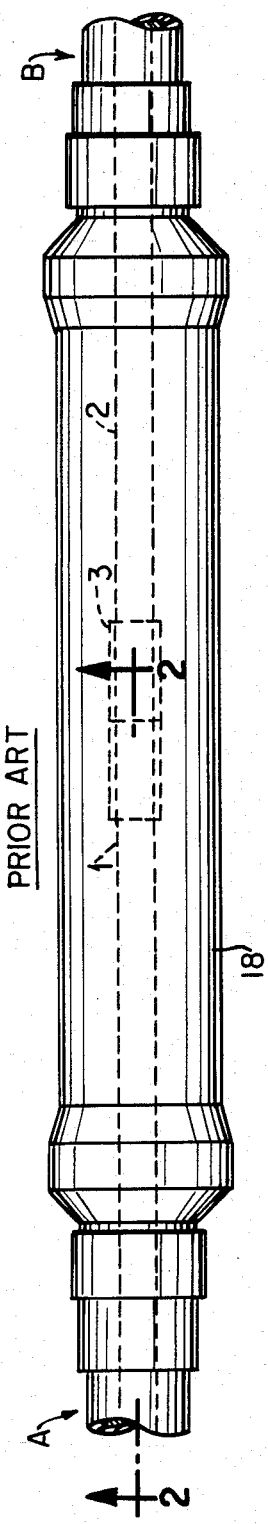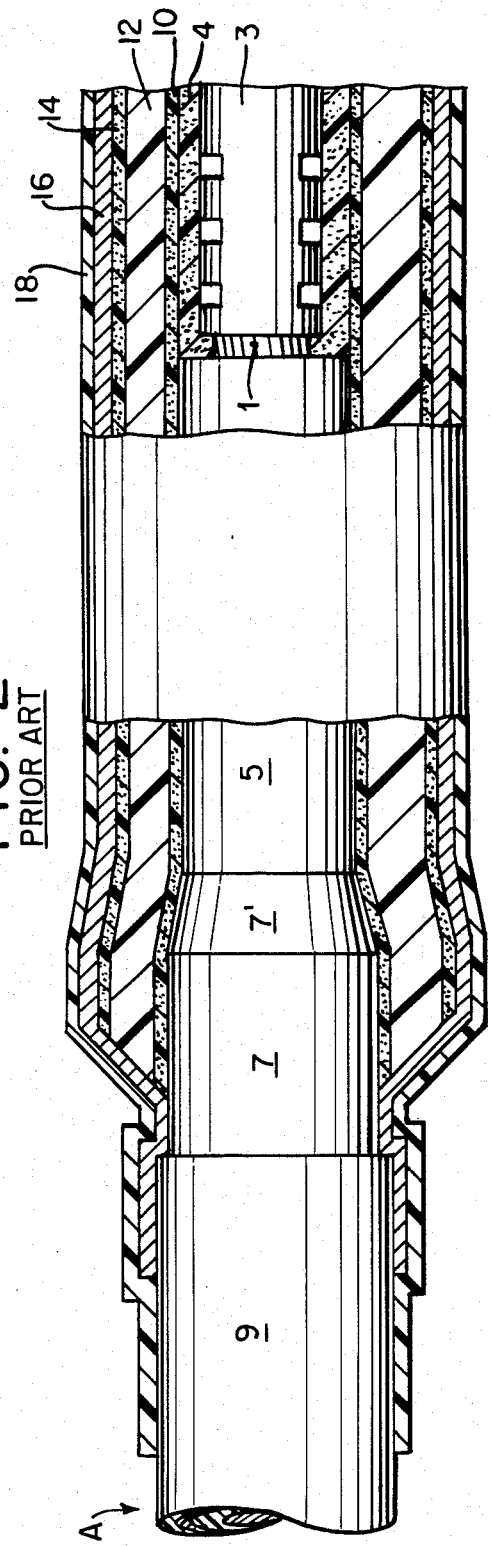
FIG. 1
PRIOR ART
FIG. 2
PRIOR ART

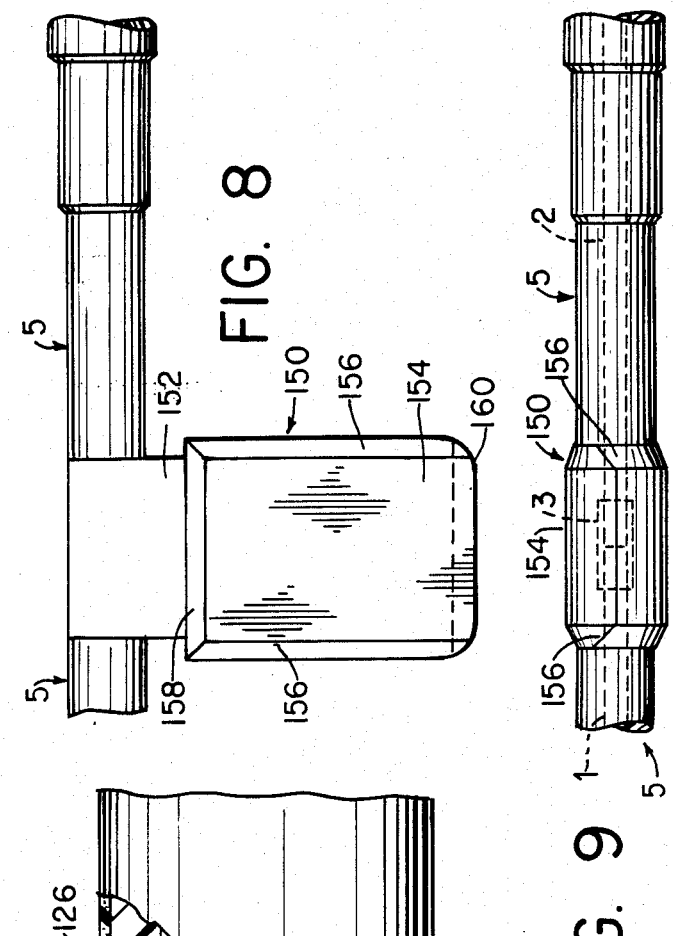
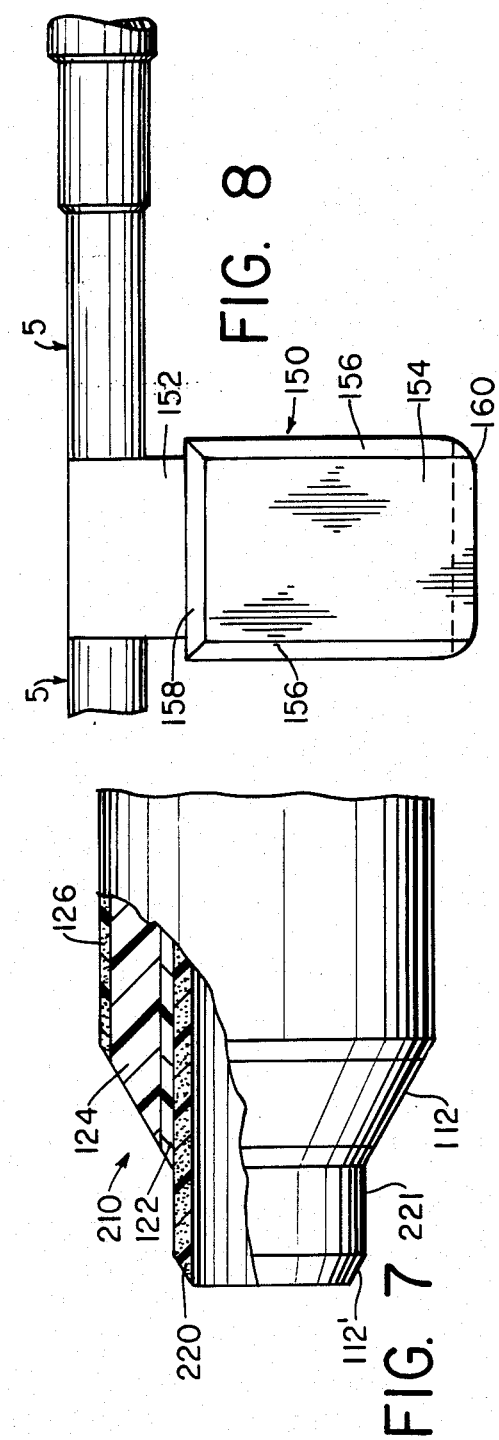
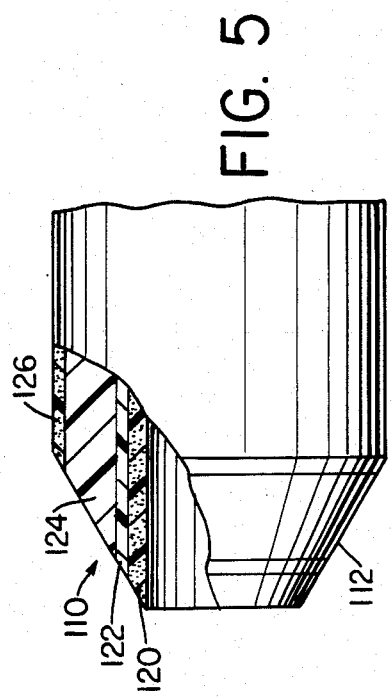
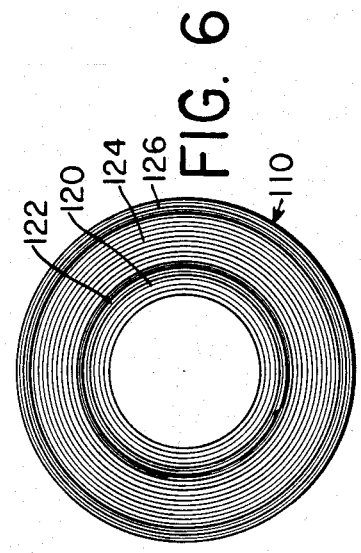

ELECTRICAL CABLE JOINT AND ELECTRICAL CABLE TERMINATION AND METHODS OF MAKING SAME

The present invention relates generally to a structure for joining or terminating electrical cables and, more particularly, concerns an insulation structure for electrical cables which employs heat shrinkable components and a method for manufacturing a joint or termination, the joint or termination being particularly useful for high and very high and very high voltage applications.

As used herein, the term "high voltage cable" will be understood to include cables rated at 10 kV and higher. In addition, an "insulating material" will be understood to be a material having a very high resistivity, preferably higher than $10^{14}$ ohm-cm at room temperature, combined with an excellent 60 Hz. dielectric strength, preferably above 500 V/mil., and a dielectric constant below 5, preferably, below 3.5. A "semiconducting material" is characterized by a room temperature resistivity of less than $10^{11}$ ohm-cm, low dielectric strength and an extremely high dielectric constant. In quantifying dielectric properties, a dielectric constant between 5 and 20 would be considered moderate and a dielectric strength between 50 and 450 V/mil, at room temperature, would be considered moderate.

As used herein, the term "joint structure" is intended to comprehend any structure applied to the ends of one or more cables. In the context of the present disclosure, a joint structure will therefore include not only a structure which physically joins the ends of a plurality of cables, but also a structure terminating the end of a single cable.

Cable joint structures having an insulation structure incorporating multilayered shrinkable sleeve components are known. Such joint structures and methods for forming them are disclosed, for example, in U.S. Pat. Nos. 4,383,131 and No. 4,487,994. A cable to which the joint structure is applied typically comprises a conductor covered with a concentric, multi-layer insulation system including an insulating layer and an overlying semiconductive insulation shield layer. In forming a joint between cables, the conductors of the cables are joined after the cable insulation system of each cable is cut back to expose the conductors, and the insulation shield layer of each cable is cut back further to expose portions of the insulation layers. In a subsequent step, a semiconductive conductor shield layer (also referred to as a stress-grading layer) is applied over the joined cable conductors as a part of the insulation structure of the joint. This stress grading layer overlies each conductor, is in contact with the exposed insulation layer of each cable, and extends therealong and onto the cut back insulation shield layer of each cable.

Where the stress-grading layer contacts two distinct layers, as for example the insulation layer and cut back insulation shield layer of a cable, the transition between those two layers must be smooth and gradual. Another location in the joint where a transition similarly occurs is at the point to which the insulation system of a cable is cut back to expose the conductor. In forming the joint, each conductor itself is normally covered with a semiconductive material, which is built up at least to the level of the outside diameter of the cable insulation layer. The transition from this semiconducting material to the cable insulation layer must also be made gradual and smooth. Should such transitions not be prepared properly, cavities can result at the edge of a layer of semiconducting material, and partial discharge may occur under voltage stress. This can lead to insulation erosion and subsequent breakdown of the joint.

Owing to the importance of smooth and gradual transitions between layers underlying the stress grading layer of the insulation structure, such transition must be prepared very carefully at the time the joint is assembled, and this is a labor intensive process. By simplifying or eliminating the transition preparation process, substantial cost savings can be realized and a substantial reduction in the time required to complete a joint can be achieved. It is therefore an object of the present invention to simplify or eliminate the process of preparing a smooth transition between successive layers of each cable insulation system when a joint is being formed.

Prior art insulation structures for cable joints also occupy a substantial amount of space, both axially (along the length of each cable) and radially. For example, each cable insulation shield is preferably cut back from the end of the insulation layer at least one inch for every 10 kV of rated voltage between the conductor and ground, and practical requirements dictate that the insulation shield be cut back even further. Inasmuch as the insulation structure, including the shrinkable sleeve, extends over the insulation shields of the cables in prior art joints, the joint structure itself occupies a considerable length along the cables. Also, the thickness of the insulation layer of the joint structure is, as a minimum, comparable to the thickness of each cable insulation layer over which it is fitted, so that the completed joint has a rather large diameter. It would be preferable to minimize the length and diameter of the completed joint. It is therefore another object of the present invention to provide a joint structure for high voltage cables which has a reduced, and preferably a minimum, length and diameter.

Broadly it is an object of the present invention to overcome the shortcomings of prior art joints for electrical cables and especially of joint structures employing shrinkable insulation structures. It is specifically contemplated that such a joint structure be provided which has an extremely high electrical strength, as high as that of each cable itself, short length and diameter, and sufficient longitudinal voltage distribution.

It is also an object of the present invention to provide a joint structure for electrical cables including a heat-shrinkable insulation structure and a method for making the same which are reliable and convenient in use yet relatively inexpensive.

In accordance with one aspect of the present invention, a joint structure is provided in which the insulation structure extends over and beyond the cut back insulation layer of each cable, but terminates at a distance ahead of the cut back insulation shield layer of each cable. Preferably, the insulation structure of the joint structure includes a multi-layered, heat shrinkable tube with its ends beveled or "feathered". In assembling the joint, the tube is positioned to overlie each cable conductor and insulation layer and is shrunk thereover so as to terminate at a distance ahead of the cut back insulation shield layer of each cable. In a subsequent step, a semiconductive insulation shield jumper layer is applied over the shrunk tube and cables so as to extend a substantial distance over the cable insulation layers and insulation shield layers. This construction not only results in a joint structure of reduced length, but it entirely obviates the careful preparation involved in gradually tapering the transition from the semiconductive insulation shield layer to the insulation layer of each cable. The heat shrinkable tube can be manufactured with feathered edges, so that no additional time or labor is required to shape the sleeve when the joint is assembled.

In accordance with another aspect of the invention, a semiconductive conductor shield member is applied in continuous convoluted layers over the exposed conductors of the joint prior to application of the heat shrunk tube. The conductor shield member is an elongated strip formed with a narrowed forward portion and a somewhat wider rear portion, which is feathered along either longitudinal edge. The forward portion of the conductor shield member is made wide enough to cover the exposed conductors of the joint and to abut the cut back ends of the cable insulation layers, while the length and thickness of the conductor shield member are selected so that wrapping the forward portion in consecutive layers over the exposed conductors of the joint produces an outside diameter of the wrapped portion of the conductor shield member which is at least as great as the outer diameters of the cable insulation layers. Any further wrapping of the conductor shield member causes the rear portion to be wrapped so as to overlap the cut back ends of the cable insulation layers, with the feathered edge of the rear portion of the conductor shield member providing a gradual and smooth transition over the cable insulation layers. The conductor shield member is preferably constructed so as to be pre-curled about an axis perpendicular to its length. This speeds assembly of the joint, since the conductor shield member is then quickly and easily applied over the exposed conductors and, upon being released, automatically assumes the correct position.

In accordance with a further aspect of the invention, the overall diameter of a completed cable joint can be reduced substantially by making the insulation shield layer of the heat-shrinkable composite tube out of a high dielectric strength material in two layers instead of a semi-conductive material layer.

The foregoing brief description, as well as further objects, features and advantages of the present invention will be more completely understood from the following detailed description of presently preferred, but nonetheless illustrative, embodiments of the present invention, with reference being had to the drawing, in which:

FIG. 1 illustrates an assembled prior art cable joint for high voltage cables;

FIG. 2 is a sectional view, on an enlarged scale, taken along line 2—2 in FIG. 1;

FIG. 5 is a fragmentary view, on an enlarged scale, showing the left end portion of the cable joint structure of FIG. 3, with parts cut away to show its internal details;

FIG. 6 is an end view taken from the left side of FIG. 5;

FIG. 7 is a fragmentary view, on an enlarged scale, similar to FIG. 5, showing an alternate form of the cable joint structure;

FIG. 8 shows the conductor shield member being applied over the connected conductors of a cable joint, with the narrowed forward portion of the conductor shield member extending between and in abutment with the cut back ends of the cable insulation layers;

FIG. 9 illustrates the joint of FIG. 8 with the conductor shield member of the joint completely applied to the cables, prior to the application of the heat shrunk tube.

Figure 3:
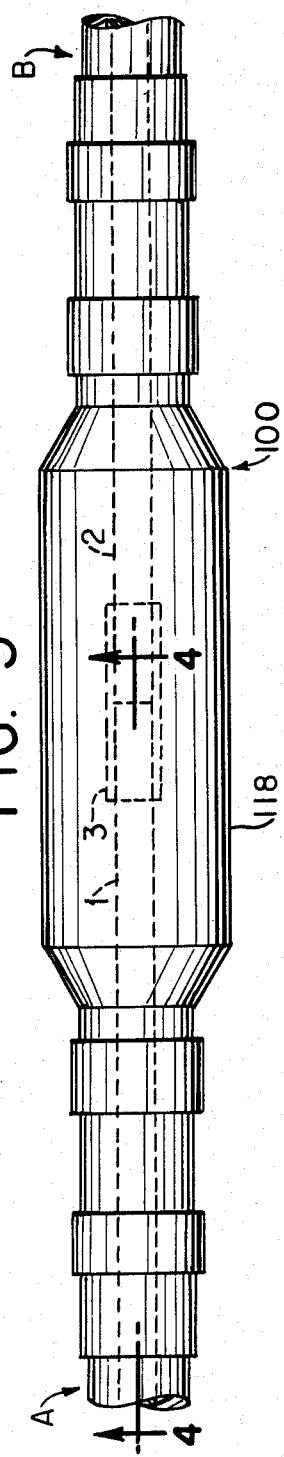
FIG. 3 illustrates an assembled cable joint for high voltage cables incorporating the present invention.

Turning now to the details of the drawing, FIGS. 1 and 2 illustrate a typical prior art joint structure for high voltage cables, shown in this case as an actual joint between two cables A,B. FIG. 2 illustrates only the left half of the joint. Those skilled in the art will appreciate that the right half of the joint is an identical mirror image of the left half and need not be shown in detail. The cables A,B have the conductors 1 and 2, respectively, which are connected together at their ends by a conventional connector 3. As is common, each cable also has a coaxial insulation system including a layer of cable insulation 5 and this insulation layer is, in turn, covered by a coaxial semiconducting insulation shield 7, which is carefully prepared to have a smooth, gradual transition portion 7'. The cable joint is then covered with several coaxial layers of material, as explained in detail below, to provide insulation and to avoid discharges and failure at the joint.

To form the first layer of the insulation structure, the cable conductors 1 and 2 and the connecting piece 3 are covered with an appropriate semiconductive material 4, for example tape, until the outside diameter of the joint is at least equal to the outside diameter of the insulation layers 5 of the cables. Although the semiconductive layer 4 has been shown in abutting relationship to the insulation layers of the cable, it is also possible to overlap a portion of the layer 4 over the insulation layers of the cables. Overlying the layer 4, there is a multi-layered insulation stucture including a joint stress grading layer 10, a joint insulation layer 12 and a semiconductive joint insulation shield layer 14. These three layers 10, 12 and 14 comprise the primary insulation structure of the joint, which extends over the layer 4, the cable insulation layers 5,5 and the cable insulation shield layers 7,7. To complete the joint, the layers 10, 12 and 14 are covered with a metallic shielding tape 16, which is in turn covered with a protective jacket 18, typically made of a hard plastic material. The shielding tape 16 covers the entire joint, as well as the cable insulation shield layers 7 and the cable grounding sheaths 9 (typically lead). The joint jacket 18 covers the entire shielding tape 16 and extends beyond it onto the cable sheaths 9, thereby providing complete protection for the joint. It is known that one or more of the insulation structure layers 10, 12 and 14 can be formed through the use of heat shrinkable tubing.

FIG. 3 illustrates a completed cable joint 100 embodying the present invention. The joint is illustrated on essentially the same scale as the prior art joint of FIG. 1, in order to illustrate the reduction in joint length achievable with joint structures embodying the present invention. As was the case with FIG. 2, FIG. 4 includes only the left half of the joint 100. However, it will be understood that the right hand half of the joint is a mirror image of the left hand half. Components in FIG. 4 which are identical to components in FIG. 2 have been represented by the same reference characters.

Preparation of the joint 100 is begun, according to the usual practice, by cutting back the insulation systems of the cables to expose their conductors, and cutting back the top layers of the cables to expose portions of the insulation layers. As has been pointed out previously, it is the usual practice to expose at least one inch of the insulation layer for every 10 kV of rated voltage between the conductor and ground. Any layers overlying the semiconductive insulation shield layer 107 of each cable are then cut back to expose a substantial length of the insulation shield layer.

Assembly of the joint begins with the application a semiconductive conductor shield member 150 (discussed in detail below) over the conductor connector 3. The outside diameter of conductor shield member 150 is built up so as to be at least as great as the outside diameter of the cable insulation 5. Thereafter, a multi-layered, heat-shrinkable tubular member 110 (discussed in detail below) is positioned over the joint under assembly. The length of the tubular member 110 is selected so that the tubular member, after being heat shrunk, will be at least half an inch shorter than the distance between the insulation shields 107, 107 of the cables A,B but greater than the distance between the insulation layers 5,5 of the cables A,B. This assures that, after heat shrinking, each end of the tubular member 110 will terminate at a distance from the transition between the insulation layers 5 and the insulation shields 107 of the cables A and B, respectively.

Tubular member 110 is formed with a feathered exterior surface 112 at either end. Prior to heat shrinking the tubular member 110, the exposed insulation layer 5 of each cable and the joint conductor shield member 150 are preferably covered by a thin layer of silicone grease or similar material, in order to minimize the frictional forces that develop when the heat-shrunk tubular member 110 cools. In this manner, longitudinal shrinkage is maximized at this stage of the joint assembly, and there should be little or no shrinkage during subsequent steps.

Tubular member 110 is preferably centered between the insulation shield layers 107, 107 of cables A and B. Hence, after tubular member 110 is shrunk over the connection between the cables A and B, the tubular member terminates at a distance from and ahead of each of the cut back insulation shield layers 107, 107. The portion of the exposed insulation 5 extending between the end of tubular member 110 and each cable insulation shield layer 107 is covered with a layer 109 of semiconductive paint or a semiconductive powder, such as graphite.

After the semiconductive paint layer has dried, a semiconductive tape or shrinkable semiconductive sleeve jumper 114, having conducting characteristics similar to the insulation shield of the cable, is applied at either end of the joint so as to extend between and cover a portion of the cable insulation shield layers 107 and the exterior of the tubular member 110. Sleeve jumper 114 also covers the semiconductive paint layer 109 and the feathered surface 112 of tubular member 110. Sleeve jumper 114 overlaps cable insulation shield layer 107 and the outermost layer of tubular member 110 (also an insulation shield layer, as will be shown below) by a minimum of five times their respective thicknesses.

The joint structure is completed by applying a metallic braid or metallic tape 116 so to cover the entire joint area. This metallic shielding layer 116 extends from metallic sheath 9 of cable A to the metallic sheath 9 of cable B. This metallic shielding layer 116 of the joint is then covered with an overall insulating or semiconducting jacket 118, which also could have shrinkable characteristics.

FIGS. 5 and 6 illustrate a preferred construction for the tubular member 110. It is preferred that the tubular member be pre-fabricated and be available in various sizes to accommodate different sizes of cable and various joint lengths. The tubular member must have at least a semiconductive inner shield layer and an overlying insulation layer. However, the preferred embodiment includes a semiconductive inner shield layer 120, an auxiliary insulation layer 122, an insulation layer 124, and an outer or insulation shield layer 126. In order to facilitate joint assembly, feathered surface 112 is added to tubular member 110 at the time of its manufacture.

In order to obtain an improved interface between the inner shield layer and the insulation of the tubular member 110, the inner shield layer 120 and auxiliary insulation layer 122 are formed by co-extrusion. This eliminates any imperfections that normally occur between the inner shield and insulation when they are extruded separately or with tandem extruders. Thereafter, the insulation layer 124 is extruded over the auxiliary insulation layer 122 and the insulation shield layer 126 is extruded over the insulation layer 124. One of the advantages of using an auxiliary layer of insulation extruded over the inner shield is that it allows for some reduction in the overall diameter. All layers are cross-linked, expanded and cooled simultaneously in a single pass. As a consequence, the various layers of the tubular member 110 are intimately and permanently bonded together. The structure and method of manufacture of tubular members of this type are disclosed in detail in co-pending U.S. patent application Ser. No. 645,013, filed on Aug. 28, 1984 and owned by the assignee of the present application.

By applying the sleeve conductor shield and the auxiliary insulation layer in one common extrusion head, the overall thickness of the insulation can be reduced. This is achieved because when conductor shield and insulation are applied in separate heads, certain irregularities may appear in the surface of the conductor shield (owing to frictional interaction with the tools in the second crosshead), leading to points of voltage stress, enhancement. By extruding both layers in the same head, this is avoided and a reduction of overall insulation thickness becomes feasible. It should be noted that the same irregularities as in the surface of the conductor shield will now appear in the surface of the auxiliary insulation layer, but because this surface will now blend with the same material in the main layer of insulation, no effects of voltage enhancement are experienced.

A further improvement is achieved if the auxiliary insulation layer 122 of tubular member 110 is a dielectric material with a higher dielectric constant and smaller dielectric strength that that of the primary insulation layer 124. In particular, the voltage stress at the interface between the inner semiconducting shield layer 120 and the insulation is minimized if the dielectric strengths of the auxiliary and primary insulation layers conform to the following relationship:

$$\frac{Ea}{Ep} = \frac{ep}{ea},$$

where Ea and Ep are dielectric breakdown strengths of the materials of the auxiliary and primary insulation layers 122 and 124, respectively, and ea and ep are the respective dielectric constants of these materials. The dielectric breakdown strength of the auxiliary insulation layer 122 should, however, not be significantly lower than that of the primary insulation layer 124, in order to avoid deteriorating the overall breakdown strength of the joint. Materials having dielectric strengths above 200 V/mil are suitable for this purpose.

In the embodiment of FIGS. 5 and 6, the inner shield layer 120 and the outer shield layer 126 are both made of semiconductive materials. However, it has been found that the outer shield layer 126 can advantageously be made of a material having a medium to high dielectric constant (i.e., less than 50 but more than 5), having a reasonable dielectric strength (i.e. greater than 50 V/mil but less than 450 V/mil) at a room temperature, and having a resistivity in the higher ranges of semiconductive materials or between that of a semiconductive material and an insulating material. Such materials can be made using good high voltage insulating materials, such as polyethylene, ethylene propylene rubber, neoprene or chlorosulfonated polyethylene, and loading these materials with particles of another material, such as titanium dioxide or carbon, etc. so as to increase the dielectric constant to the preferred levels. Levels and types of additives must, however, be selected so as not to convert the materials into semiconductors. One of the advantages of using a high dielectric constant insulation shield is that it allows for some reduction in the overall diameter of the tubular member insulation, thereby permitting a reduction in the overall diameter of the joint.

FIG. 7 illustrates an alternative embodiment 210 of tubular member 110. In this embodiment, identical components are represented by the same reference characters. The essential difference between tubular members 210 and 110 is that, in member, 210, a portion 221 of the surface of inner conductor shield layer 220 is exposed to permit increased contact area between the inner shield layer 220 and the jumper sleeve 114. This has the effect of interrupting the feathered surface 112, but the inner shield layer is provided with a feathered end portion 112', in order to provide the requisite smooth interface.

FIGS. 8 and 9 illustrate a preferred embodiment of conductor shield member 150. The conductor shield member 1150 is an elongated strip formed with a narrowed forward portion 152 and a somewhat wider rear portion 154. Forward portion 152 is made wide enough to cover the exposed conductors of the joint and to abut the cut back ends of cable insulation layers 5, 5, while the length and thickness of the forward portion are selected so that wrapping it in consecutive layers over the exposed conductors of the joint produces an outside diameter of the wrapped portion which is at least as great as the outer diameters of the cable insulation layers 5, 5. Normally, portion 152 would have a thickness in the range of 10-30 mils.

Once portion 152 has been wrapped over itself in consecutive convolutions, any further wrapping of conductor shield member 150 will cause the rear portion 154 to be wrapped over the portion 152. Rear portion 154 preferably includes lateral feathered edges 156,156, a forward feathered edge 158 and an underneath rear feathred edge 160. However, forward and rear feathering are not essential, since it has been found adequate to provide rear edge feathering on the top surface. The width of rear portion 154 is selected so as to overlap the cable insulation layers 5, 5 by at least 0.05 inch, with the feathered edges 156, 156 providing a smooth transition between the conductor shield member 150 and the cable insulation layers 5, 5. The length of rear portion 154 is selected to provide one complete wrap of the rear portion over the forward portion 152. The feathered edges 158 and 160 are designed to conform, so that they come into perfect engagement upon completion of the final wrap of rear portion 154 (see FIG. 9).

Conductor shield member 150 is preferably made of a semiconductive material having similar characteristics to the cable insulation shield. Such materials will have a resistivity of less than $10^5$ ohm-cm at room temperature. Preferably, the conductor shield member is made so as to be pre-curled. This is conveniently accomplished in two different ways. One way is that the pre-cut, pre-shaped, flat, cross-linked strip 150 can be rolled over a firm element having a diameter comparable to the diameter of the conductor over which it will be applied. The rolled material is then held in place while it is heated to about 170° C. for half an hour. This time has been found to be sufficient to set the material in its rolled shape. If the material is then unrolled, it will recover to its rolled shape, unless it is reheated.

An alternate method for preparing the pre-curled element is by starting with a pre-cut, pre-shaped, flat, but uncured strip of material having cross-linking additives which will allow it to be cross-linked when subjected to proper conditions of temperature, time and pressure. Cross-linking is then performed with the strip in its rolled up condition. Thereafter, every time the material is reheated it will recover to its curled-up shape.

When a conductor shield member of the first type is used, it can simply be applied to the junction by being straightened and then permitted to curl up to its natural shape, to complete the application of the conductor shield member 150. When a conductor shield member of the second type is used, it is positioned over the joint, and heat is then applied to cause the member to curl into position. In either case, the conductor shield member 150 is quickly and easily applied to the joint, and the process of assembling the joint is substantially speeded up.

Figure 4:
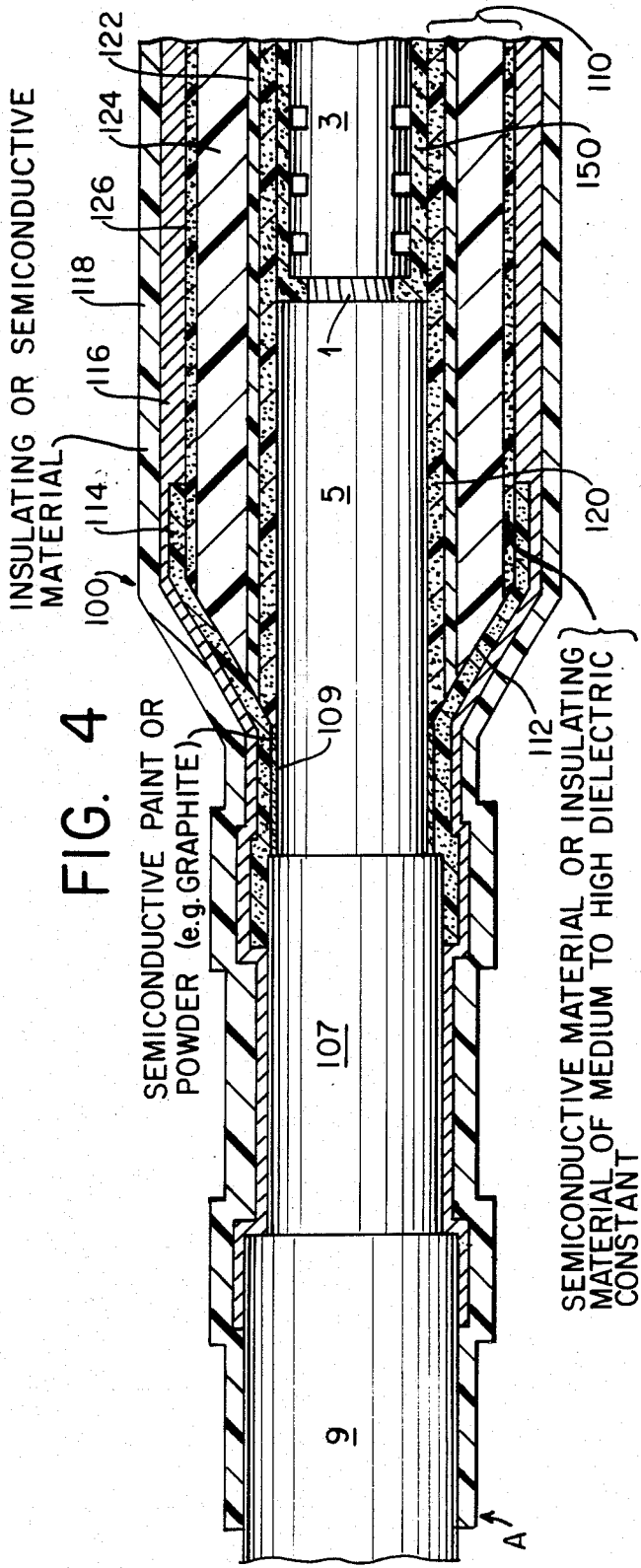
FIG. 4 is a sectional view, on an enlarged scale, taken along line 4—4 in FIG. 3.
Figure 10:
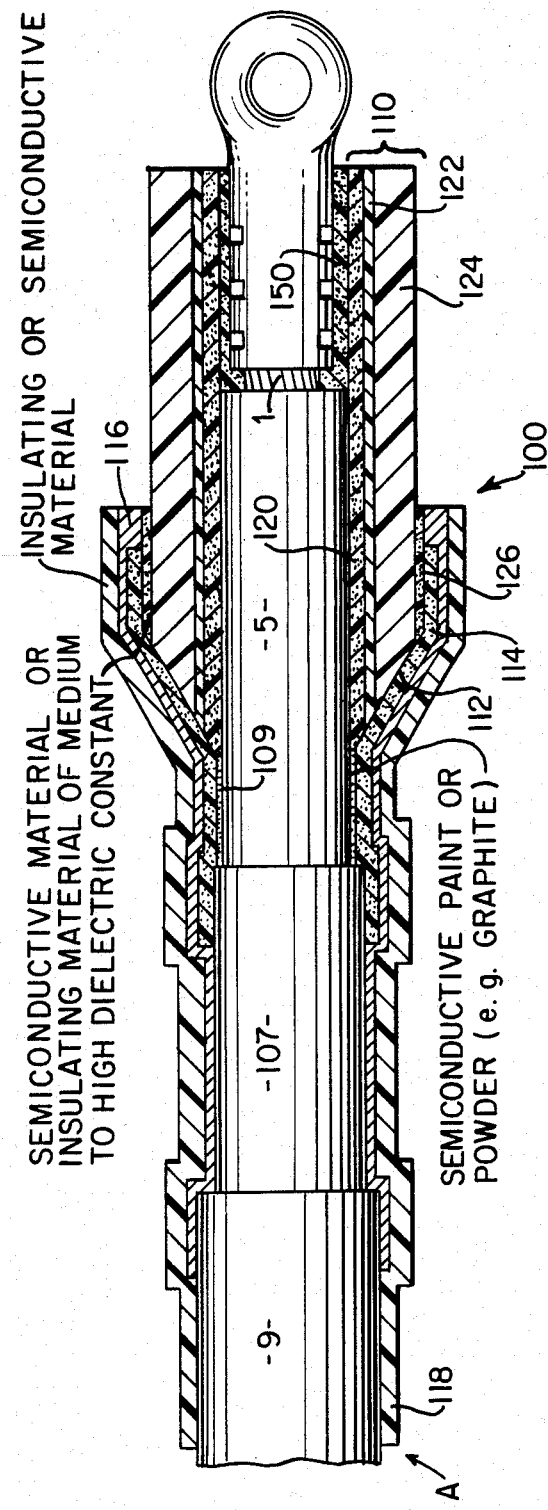
FIG. 10 is a sectional view, similar to FIG. 4, showing the present invention as applied to a termination of a single cable, instead of a joint between two cables.

FIG. 10 is a sectional view, similar to FIG. 4, showing how the invention is embodied in a termination of a single cable, instead of a joint between two cables. FIG. 10 is identical to FIG. 4, except in the respects that are to be discussed below, and corresponding components have been represented by the same reference characters. A number of differences are immediately apparent. First of all, the connecting piece 3 is replaced by a terminating lug, as would be expected by those skilled in the art. In addition, the layers 126, 116 and 118 are cut back for a distance from the terminating end of the cable, as would also be expected by those skilled in the art, in order to avoid a short circuit path from the lug to the insulation shield of the cable. In addition, only one end of the tubular member 110 is feathered or tapered (i.e. the end remote from the terminating lug), and the terminating end of the tubular member 110 is shown as terminated flush at the lug. Otherwise, the structure of the termination in FIG. 10 is identical to the structure of the joint in FIG. 4.

Although preferred forms of the invention have been disclosed for illustrative purposes, those skilled in the art will appreciate that many additions, modifications and substitutions are possible without departing from the scope and spirit of the invention as defined in the accompanying claims.

What is claimed is:

1. A joint between electrical cables, comprising:
electrical cables of the type having an electrical conductor, a coaxial insulation layer lying over the conductor, and a semiconductive insulation shield layer lying over the insulation layer, the end of the insulation layer of each cable being cut back to expose a portion of the respective conductor and the end of each semiconductor insulation shield layer being cut back to expose a portion of the respective insulation layer, the conductors being connected together, an insulating structure including a heat-shrunk composite tube including, in successive, substantially coaxial layers, an inner semiconductive shield layer overlying said exposed portions of said conductors and extending over said exposed portions of said cable insulation layers in contact therewith, and a joint insulation layer joined to said inner semiconductive shield layer, said inner semiconductive shield layer being at least coextensive with said joint insulation layer and terminating at a distance from the ends of the semiconductive insulation shield layers of said cables; and semiconductive coatings extending between and contacting said inner semiconductive shield layer of said tube and said semiconductive insulation shield layers of said cables.

2. A joint according to claim 1 wherein said composite tube further comprises an insulation shield layer overlying said joint insulation layer.

3. A joint in accordance with claim 2 wherein said insulation shield layer of said composite tube is made of a semiconductive material.

4. A joint in accordance with claim 2 wherein the insulation shield layer of said composite tube is made of a material having a high dielectric constant.

5. A joint in accordance with claim 1, further comprising heat-shrunk, semiconductive jumper sleeves extending over and in contact with said composite tube, said semiconductive coatings, and said semiconductive insulation shield layers of the cables.

6. A joint in accordance with claim 5 further comprising the ends of said composite tube terminating on said insulation layers of said cables having feathered edges.

7. A joint in accordance with claim 1 wherein said joint insulation layer of said composite tube comprises an auxiliary insulation layer formed by co-extrusion with said inner semiconductive shield layer and a primary insulation layer overlying said auxiliary insulation layer.

8. A joint in accordance with claim 7 wherein the compositions of said auxiliary and primary insulation layers are selected in accordance with the expression:

$$E_a/E_p = e_p/e_a$$

where $E_a$ and $E_p$ are the dielectric breakdown strengths of said auxiliary and primary insulation layers and $e_a$ and $e_p$ are the respective dielectric constants thereof.

9. A joint in accordance with claim 1, further comprising a conductor shield member formed from an elongated strip of semiconductive material formed with a narrowed forward portion and a wider rear portion, the forward portion being of a width to extend over said joined conductors in abutment with the cut back ends of said insulation layers of said cables, the thickness and length of said forward portion being calculated so that a predetermined number of convoluted layers provide an outside diameter at least equal to the outside diameter of each cable insulation layer, said rear portion being wider than the distance between the cut back ends of said insulation layers of said cables, so that the edges of said rear portion overlap said insulation layers, the overlapping edges of said rear portion being feathered.

10. A joint in accordance with claim 9 further comprising said conductor shield member having at least a feathered rear edge on said rear portion to assure a smooth transition when said rear portion of said conductor shield member is wrapped so as to overlap said cable insulation layers.

11. A joint in accordance with claim 9 further comprising said conductor shield member having a feathered forward, upper edge on said rear portion and a feathered rear underlying edge on said rear portion, said feathered forward and rear edges being spaced so as to come into engagement when said rear portion of said conductor shield member is wrapped so as to overlap said cable insulation layers.

12. A joint in accordance with claim 9 further comprising said conductor shield member being constructed so as to be pre-curled substantially to the outside diameters of said cable insulation layers.

13. A joint in accordance with claim 12 wherein said conductor shield member is constructed so as to curl essentially to the outside diameters of said cable conductors upon the application of heat thereto.

14. A joint in accordance with claim 13 further comprising at least a feathered rear edge of said rear portion for assuring a smooth transition when said rear portion of said conductor shield member is wrapped so as to overlap said cable insulation layers.

15. A method for insulating a junction of electrical cables, each having a conductor and successive coaxial layers defining an insulation layer and an insulation shield semiconducting layer, said insulation layers having their ends cut back to exposed a portion of said conductors, and said insulation shield semiconducting layers having their ends cut back from the cut back ends of the insulation layers by at least one inch for every 10 kV of rated voltage between the conductor and ground, the expose portions of said conductors being connected together at said junction, said method comprising the steps of (1) providing a heat shrinkable composite tube comprising an inner semiconductive shield layer and an insulation layer joined to said inner semiconductive shield layer, said inner semiconductive shield layer being at least coextensive with said insulation layer and being dimensioned so as to have a length, when heat shrunk, which is predetermined on the basis of said rated voltage to be less than the distance between the cut back ends of said insulation shield semiconducting layers of said cables but greater than the distance between the cut back ends of the insulation layers of said cables, said composite tube being formed with feathered edges at the ends thereof, (2) positioning said composite tube over said junction such that when heat shrunk its ends will be spaced from the cut back ends of the insulation shield semiconducting layers of said cables but will overlap the cut back ends of the insulation layers of said cables, and (3) heat shrinking and composite tube.

16. The method of claim 15 further comprising the steps of (1) providing a conductor shield member comprising an elongated strip of semiconductive material formed with a narrowed forward portion and a wider rear portion, the forward portion being of a width to extend over the joined conductors of the junction and in abutment with the cut back ends of said insulation layers of said cables, the thickness and length of said forward portion being calculated so that a predetermined number of convoluted layers of said forward portion, when wrapped over said conductors, provide an outside diameter at least equal to the outside diameter of said cable insulation layers, said rear portion being wider than the distance between the cut back ends of said insulation layers of said cables, so that the edges of said rear portion overlap said insulation layers when said conductor shield member is wrapped over said conductors, the overlapping edges of said rear portion being feathered; and (2) applying said conductor shield member to said junction by wrapping said conductor shield member thereover before the conductors of said cables are covered by said heat shrinkable composite tube.

17. An electrical cable termination comprising: an electrical cable of the type having an electrical conductor, a coaxial insulation layer lying over the conductor, and a semiconductive insulation shield layer lying over the insulation layer, the end of the insulation layer of the cable being cut back to expose a portion of said conductor to which a conductive lug is secured and the end of the semiconductive insulation shield layer being cut back from the cut back end of the insulation layer to expose a portion of said insulation layer;
 a heat-shrunk composite tube including in successive, substantially coaxial layers over said exposed conductor, an inner semiconductive shield layer overlying said conductor and extending over said cable insulation layer in contact therewith, and a termination insulation layer joined to said inner semiconductive shield layer, said inner semiconductive shield layer being at least coextensive with said termination insulation layer and terminating at a distance from the cut back end of the semiconductive insulation shield layer of said cable; and
 a semiconductive coating extending between and contacting said inner semiconductive shield layer of said tube and said semiconductive insulation shield layer of said cable.

18. A termination according to claim 17 wherein said composite tube further comprises an insulation shield layer overlying said termination insulation layer.

19. A termination in accordance with claim 18 wherein said insulation shield layer of said composite tube is made of a semiconductive material.

20. A termination in accordance with claim 18 wherein the insulation shield layer of said composite tube is made of a material having a high dielectric constant.

21. A termination in accordance with claim 17 further comprising a heat-shrunk, semiconductive jumper sleeve extending over and in contact with said composite tube, said semiconductive coating, and said semiconductive insulation shield layer of said cable.

22. A termination in accordance with claim 21 further comprising the end of said composite tube terminating on said insulation layer of said cable having a feathered edge.

23. A termination in accordance with claim 17 wherein said termination insulation layer of said composite tube comprises an auxiliary insulation layer formed by co-extrusion with said inner semiconductive shield layer and a primary insulation layer overlying said auxiliary insulation layer.

24. A termination in accordance with claim 23 wherein the compositions of said auxiliary and primary insulation layers are selected in accordance with the expression:

$$E_a/E_p = e_p/e_a$$

where $E_a$ and $E_p$ are the dielectric breakdown strengths of said auxiliary and primary insulation layers and $e_a$ and $e_p$ are the respective dielectric constants thereof.

25. A termination in accordance with claim 17, further comprising a conductor shield member formed from an elongated strip of semiconductive material formed with a narrowed forward portion and a wider rear portion, the forward portion being of a width to extend over a portion of said conductive lug and said conductor in abutment with the cut back portion of said insulation layer of said cable, the thickness and length of said forward portion being calculated so that a predetermined number of convoluted layers provide an outside diameter at least equal to the outside diameter of said cable insulation layer, and an edge of said rear portion overlapping said insulation layer, the overlapping edge of said rear portion being feathered.

26. A termination in accordance with claim 25 further comprising said conductor shield member having at least a feathered rear edge on said rear portion to assure a smooth transition when said rear portion of said conductor shield member is wrapped so as to overlap said cable insulation layer.

27. A termination in accordance with claim 25 further comprising said conductor shield member having a feathered forward, upper edge on said rear portion and a feathered rear underlying edge on said rear portion, said feathered forward and rear edges being spaced so as to come into engagement when said rear portion of said conductor shield member is wrapped so as to overlap said cable insulation layer.

28. A termination in accordance with claim 25 further comprising said conductor shield member being constructed so as to be pre-curled substantially to the outside diameter of said cable insulation layer.

29. A termination in accordance with claim 28 wherein said conductor shield member is constructed so as to curl essentially to the outside diameter of said conductive lug upon the application of heat thereto.

30. A termination in accordance with claim 29 further comprising at least a feathered rear edge of said rear portion for assuring a smooth transition when said rear portion of said conductor shield member is wrapped so as to overlap said cable insulation layer.

31. A method for insulating a termination of an electrical cable having a conductor with a conductive lug secured thereto and successive coaxial layers defining an insulation layer and an insulation shield semiconducting layer, said insulation layer having its end cut back to expose a portion of said conductor, and said insulation shield semiconducting layer having its end cut back from the cut back end of the insulation layer by at least one inch for every 10 kV of rated voltage between the conductor and ground, said exposed portion of said conductor being joined to said conductive lug, said method comprising the steps of (1) providing a heat shrinkable composite tube comprising an inner semiconductive shield layer and an insulation layer joined to said inner semiconductive shield layer, said inner semiconductive shield layer being at least coextensive with said insulation layer and being dimensioned so as to have a length, when heat shrunk, which is predetermined on the basis of said rated voltage to be less than the distance between the end of the cable and the cut back end of said insulation shield semiconducting layer of said cable but greater than the distance between the end of the cable and the cut back end of the insulation layer of the cable, said composite tube being formed with a feathered edge at one end thereof, (2) positioning said composite tube over the end of said cable and a portion of said conductive lug such that when heat shrunk its feathered edge will be spaced from the cut back end of the insulation shield semiconducting layer of the cable but will overlap the cut back end of the insulation layer of the cable, and (3) heat shrinking said composite tube.

32. The method of claim 31, further comprising the steps of (1) providing a conductor shield member comprising an elongated strip of semiconductive material formed with a narrowed forward portion and a wider rear portion, the forward portion being of a width to extend over the conductive lug of the termination and in abutment with the cut back end of said insulation layer of said cable, the thickness and length of said forward portion being calculated so that a predetermined number of convoluted layers of said forward portion, when wrapped over said conductor and joined conductive lug, provide an outside diameter at least equal to the outside diameter of said cable insulation layer, said rear portion being wider than the distance between the end of the cable and the cut back end of the insulation layer of said cable, so that an edge of said rear portion overlaps said insulation layer when said conductor shield member is wrapped over said conductor and joined conductive lug, the overlapping edge of said rear portion being feathered; and (2) applying said conductor shield member over the joined conductor and conductive lug by wrapping said conductor shield member thereover before the conductor and joined conductive lug are covered by said heat shrinkable composite tube.

* * * * *